United States Patent
Kim et al.

(10) Patent No.: US 10,509,681 B2
(45) Date of Patent: Dec. 17, 2019

(54) ELECTRONIC APPARATUS FOR EFFECTIVE RESOURCE MANAGEMENT AND METHOD THEREOF

(71) Applicant: SAMSUNG ELECTRONICS CO., LTD., Suwon-si, Gyeonggi-do (KR)

(72) Inventors: Jae-hoon Kim, Anyang-si (KR); Ju-hyun Kim, Yongin-si (KR); Min-seok Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 99 days.

(21) Appl. No.: 15/812,299

(22) Filed: Nov. 14, 2017

(65) Prior Publication Data

US 2018/0143855 A1 May 24, 2018

(30) Foreign Application Priority Data

Nov. 21, 2016 (KR) .................. 10-2016-0155130

(51) Int. Cl.
G06F 9/46 (2006.01)
G06F 9/50 (2006.01)
G06F 9/48 (2006.01)
G06F 9/52 (2006.01)

(52) U.S. Cl.
CPC ............ *G06F 9/505* (2013.01); *G06F 9/4881* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 7,921,200 B2 | 4/2011 | Dieberger et al. | |
| 8,949,847 B2 | 2/2015 | Kim et al. | |
| 9,038,168 B2 | 5/2015 | Ben-Zvi et al. | |
| 9,098,521 B2 | 8/2015 | Gargash et al. | |
| 2009/0138683 A1 | 5/2009 | Capps, Jr. et al. | |
| 2014/0333633 A1 | 11/2014 | Zhang et al. | |
| 2015/0220370 A1* | 8/2015 | Ujibashi ............... | G06F 9/5088 718/104 |

FOREIGN PATENT DOCUMENTS

| | | |
|---|---|---|
| JP | 11-232141 | 8/1999 |
| KR | 10-2013-0088512 | 8/2013 |

* cited by examiner

*Primary Examiner* — Gregory A Kessler
(74) *Attorney, Agent, or Firm* — Nixon & Vanderhye P.C.

(57) ABSTRACT

A resource management method of an electronic apparatus according to an example embodiment includes storing resource information including at least one resource category for assorting hardware resources and software resources by type and an attribute category indicating attribute information of resources included in the at least one resource category in a memory of the electronic apparatus, and in response to an application requesting a specific resource, allocating the specific resource to the application based on the resource information.

19 Claims, 10 Drawing Sheets

ELECTRONIC APPARATUS FOR EFFECTIVE RESOURCE MANAGEMENT AND METHOD THEREOF

CROSS-REFERENCE TO RELATED APPLICATION

This application is based on and claims priority under 35 U.S.C. § 119 to Korean Patent Application No. 10-2016-0155130, filed on Nov. 21, 2016, in the Korean Intellectual Property Office, the disclosure of which is incorporated by reference herein in its entirety.

BACKGROUND

1. Field

The present disclosure relates generally to an electronic apparatus for effective resource management and a method of the management, and for example, to an electronic apparatus for effective resource management for allocating different kinds of resources including hardware resources and software resource, and a method of the management.

2. Description of Related Art

A computer system (or a computing system) including an Operating System (OS), or a computer system (or a computing system) including an embedded Operating System (OS) or an embedded system (hereinafter, referred to as a "system") supports multitasking to simultaneously execute a plurality of applications. Accordingly, a technique for efficiently using limited resources of a system is required so as to support the multitasking.

In general, resources are managed in a system by separating the resources into hardware resources and software resources. For example, the hardware resources may be physical devices such as a demultiplexer, a decoder, a scaler, a tuner, etc. In addition, the software resources may be logical devices such as Open Media Acceleration (OMX), etc.

However, a system having restrictions on the hardware resources and the software resources, which are different from each other, may not efficiently manage resources with restrictions.

For example, a first application may use a first video decoder, which is a hardware resource, so as to play a video of an MPEG4 stream, and a second application may use an HDMI resource, which is a hardware resource, so as to output contents (e.g., a video) from an HDMI input source.

The first video decoder and the HDMI resource are different from each other in terms of hardware, the first and second applications may use the hardware resources thereof, respectively.

However, the first video decoder and the HDMI resource share and use a system bus, which is a software resource. When a sum of bandwidths used by each hardware resource exceeds capability of a bandwidth of the system bus provided in a system, contents provided from the first application or the second application may be cracked on a screen of an electronic apparatus.

For example, a maximum bandwidth where the first video decoder and the HDMI resource are simultaneously used on the system bus may be 900 bps (bits per second), a bandwidth of the system bus used by the first video decoder when playing the MPEG4 stream may be 300 bps, and a bandwidth of the system bus used by the HDMI resource when outputting an HMDI input source may be 700 bps. Since a sum of the bandwidths simultaneously used by two resources exceeds the capacity of the bandwidth provided by the system bus, the output video content may be distorted.

In the prior art, in order to prevent the above-described image from being distorted on the screen, resources may be managed by not executing a playing application by using one of the first video decoder or the HDMI resource. In addition, in the prior art, in response to a conflict between resources, the resources may be managed by recovering a resource, which is in use, from an application and allocating the recovered resource to another application which requests the resource.

An application loaded in a background state of a display may request a resource of an application executed on a foreground of the display. When the system of the electronic apparatus recovers the resource of the application being executed on the foreground and allocates the resource to the application loaded in the background, the application executed on the foreground may be abnormally terminated, and a black screen may occur.

SUMMARY

An aspect of the example embodiments relates to providing an electronic apparatus for effective management of limited resources by efficiently allocating resources (hardware resources or software resources) to an application in multi-tasking environment where a plurality of applications are simultaneously executed, and a method of the management.

Another aspect of the example embodiments relates to providing an electronic apparatus for minimizing and/or reducing conflicts between resources by matching a promotion resource to a hardware resource so as to efficiently allocate limited hardware resources, and efficiently performing execution of a plurality of applications, and a method of managing the same.

According to an example embodiment, a resource management method of an electronic apparatus is provided, the method may include storing resource information including at least one resource category for assorting hardware resources and software resources by type and an attribute category for indicating attribute information of resources included in the at least one resource category into a memory of the electronic apparatus, and in response to an application requesting a specific resource, allocating the specific resource to the application based on the resource information.

According to an example embodiment, an electronic apparatus for resource management is provided, the electronic apparatus including a memory, and a processor configured to store resource information including at least one resource category for assorting hardware resources and software resources by type and an attribute category for indicating attribute information of resources included in the at least one resource category in the memory, and to allocate the specific resource to the application based on the resource information in response to an application requesting a specific resource.

According to an example embodiment, a non-transitory computer readable recording medium having recorded thereon a computer program which when executed by a processor, causes an electronic device to perform a resource management method in the electronic apparatus, the resource management method may include storing resource information including at least one resource category for assorting hardware resources and software resources by type and an attribute category for indicating attribute information of resources included in the at least one resource category, and in response to an application requesting a resource, allocating a resource regarding the application based on the resource information.

According to a resource management method of an electronic apparatus of an example embodiment, stability of the electronic apparatus may be efficiently maintained by managing hardware resources and software resources in a single resource management module without separating the resources, so that limited resources of the electronic apparatus may be efficiently used.

According to a resource management method of an electronic apparatus of an example embodiment, when forcibly recovering a resource from an application using the resource due to a conflict between resources that are the same, the resource may be forcibly recovered from an application on a foreground, so that a black screen may not occur.

According to the resource management method of the electronic apparatus of an example embodiment, in response to a request for the same resource from a plurality of applications, forcible termination of an application may be prevented by using an available resource of a promotion category, thereby improving capability of the electronic apparatus.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Hereinafter, the terms used in describing the various example embodiments will be briefly explained, and various example embodiments will be described in greater detail with reference to the accompanying drawings.

In the present disclosure, a 'module' or a 'unit' performs at least one function or operation and may be implemented by hardware or software or a combination of the hardware and the software. In addition, a plurality of 'modules' or a plurality of 'units' may be integrated into at least one module and may be realized as at least one processor except for 'modules' or 'units' that should be realized in a specific hardware.

In the present disclosure, a "computing system" may refer, for example, to a computer system or an embedded system including an Operating System (OS) of an electronic apparatus.

In the present disclosure, a "hardware resource" may refer, for example, to a physical device in a computing system, and a "software resource" may refer, for example, to a logical device. The physical device may be the same as a physical resource, and the logical device may be the same as a logical resource.

Example embodiments of the disclosure will be described in greater detail below in a manner that will be understood by one of ordinary skill in the art. However, example embodiments may be realized in a variety of different configurations, and not limited to descriptions provided herein. Also, well-known functions or constructions may not be described in detail if they obscure the disclosure with unnecessary detail.

Figure 1:
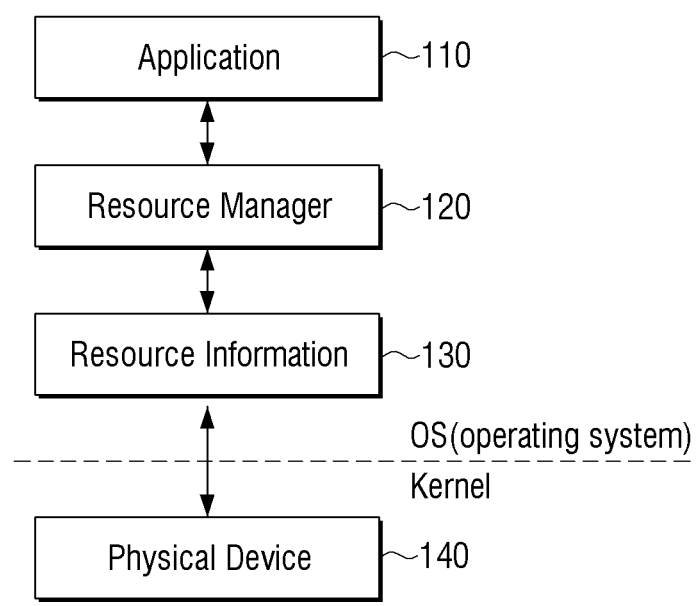
FIG. 1 is a block diagram illustrating an example computing system in an electronic apparatus according to an example embodiment.

FIG. 1 is a diagram illustrating an example computing system included in an electronic apparatus according to an example embodiment.

Referring to FIG. 1, an electronic apparatus 100 may include a computing system including an Operating System (OS) and a kernel.

The electronic apparatus 100 may be various apparatuses including an operating system for supporting multi-tasking, such as a mobile phone, a tablet PC, a computer, a television, a smart watch, or the like, but the present disclosure is not limited thereto.

The electronic apparatus 100 may include an on-chip system including hardware devices such as, for example, and without limitation, a decoder, a tuner, a multiplexer, or the like, a memory storing an operating system and a main Core Processor Unit (CPU).

The kernel may support abstraction of the hardware device on the on-chip system into a physical device 140 which is required for performing a specific function of an application 110. Therefore, the physical device 140 may be a "hardware resource" used by the hardware device to perform the function of the application 110.

The electronic apparatus 100 may receive a software device for performing the specific function of the application 110 through wired and/or wireless network communication from a server and install the software device in the electronic apparatus 100. Alternatively, the electronic apparatus 100 may execute the software device received from the server in real time. For example, the software device may be an open source such as the OMX. In addition, the electronic apparatus 100 may execute a software device installed in the electronic apparatus 100. The software device may indicate a software resource as a logical resource in a computing system.

Figure 2:
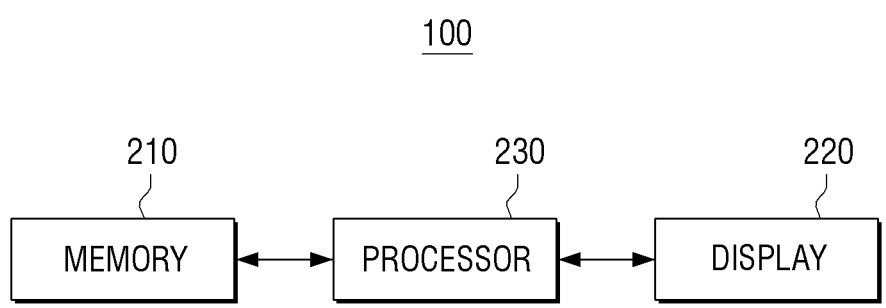
FIG. 2 is a block diagram illustrating an example configuration of an electronic apparatus according to an example embodiment.

According to an example embodiment, a resource manager 120 and resource information 130 included in the operating system may be a module including a processor 230 as illustrated in FIG. 2.

The resource manager 120 may include various processing circuitry and/or program elements that process a resource allocation request of the application 110.

The application 110 may include various processing circuitry and/or program elements that request a hardware resource or a software resource for performing a specific function of the application 110 to the resource manager 120. The application 110 may transmit resource category information including a resource to be used to the resource manager 120. Therefore, the resource manager 120 may acquire the resource category information of the resource requested by the application 110 from the application 110. For example, the resource category information may be the name or type of the category, but the present disclosure is not limited thereto.

The resource manager 120 may search resource category information structured by the resource information 130, identify whether a resource corresponding to the resource requested by the application 110 is allocable, and allocate the resource to the application 110.

The resource information 130 may include various processing circuitry and/or program elements that integrate hardware resources 140 and software resources as a program module and assort the resources by type to be used in the application 110. For example, the type used in the application may be a decoder for decoding, a multiplexer for multiplexing, etc.

According to an example embodiment, the resource information 130 may include information having attributes of the hardware resources and the software sources in a document format. For example, the document format may be an Extensible Markup Language (XML) code format, but the present disclosure is not limited thereto.

In addition, the resource information 130, in response to the computing system of the electronic apparatus 100 being initialized, may assort the resources into resource categories according to the type of resource, and store the structured information on the resources included in each resource category into the memory.

FIG. 1 illustrate a single one of the application 110 and a single one of the physical device 140 as an example embodiment for describing the present disclosure, but the present disclosure is not limited thereto.

The resource manger 120 and the resource information 130 according to an example embodiment may be described in greater detail below with reference to FIGS. 2 to 10.

FIG. 2 is a block diagram illustrating an example configuration of an electronic apparatus according to an example embodiment.

Referring to FIG. 2, the electronic apparatus 100 may include a memory 210, a display 220 and a processor (e.g., including processing circuitry) 230. However, the configuration of the electronic apparatus 100 illustrated in FIG. 2 is merely an example, and the present disclosure is not limited to the above-described block diagram. According to an example embodiment, a part of components illustrated in FIG. 2 may be omitted or changed, and other components may be further added.

The memory 210 may store various programs performed in the processor 230 and program results thereof.

The display 220 may display various contents supported by the electronic apparatus 100. Examples of the contents may be one of a video, an image, an audio, a streaming video, or the like, but the present disclosure is not limited thereto.

The display 220 may display a plurality of applications for performing the multi-tasking supported by the electronic apparatus 100.

The processor 230 may include various processing circuitry and store resource information including at least one resource category structured by assorting the hardware resources and the software sources by type into the memory 210.

The processor 230 may store resource information including an attribute category for indicating attribute information of the resources included in at least one resource category into the memory 210.

The resource information may include the names of the resources included in the at least one resource category and a data format supported by each of the resources. For example, the data formats may be MPEG1, MPEG3, H263, H264, or the like, for supporting a specific image format, but the present disclosure is not limited thereto.

The attribute information may include at least one of information of a memory and a bandwidth, which are required for a resource to execute an application, but the present disclosure is not limited thereto, and the attribute information may further include various information.

The processor 230, in response to the application 110 requesting a specific resource, may allocate the specific resource to the application 110 based on the resource information included in the resource category and the attribute category.

The processor 230 may assort a plurality of resources for providing the same function by type as the resource category and storing the plurality of resources into the memory 210, and the resource category may include resource information of each of the plurality of resources.

The processor 230, in response to the application requesting the specific resource, may acquire at least one resource category information including the specific resource from the memory 210.

The processor 230, in response to the specific resource being used by another application, may recover the specific resource from another application.

The processor 230, in response to the attribute information of the attribute category including the specific resource being shared through another resource by another application, may recover another resource from another application.

The processor 230 may identify an application displayed on the display 220, and in response to another application being displayed on the display 220, may not recover the specific resource from another application.

The processor 230 may store promotion category information which maps resources for supporting a common date format, among the resources, into the memory 210.

The processor 230, in response to the specific resource being used by another application, may allocate a promotion resource mapped to the specific resource stored in a promotion category to the application.

Figure 3:
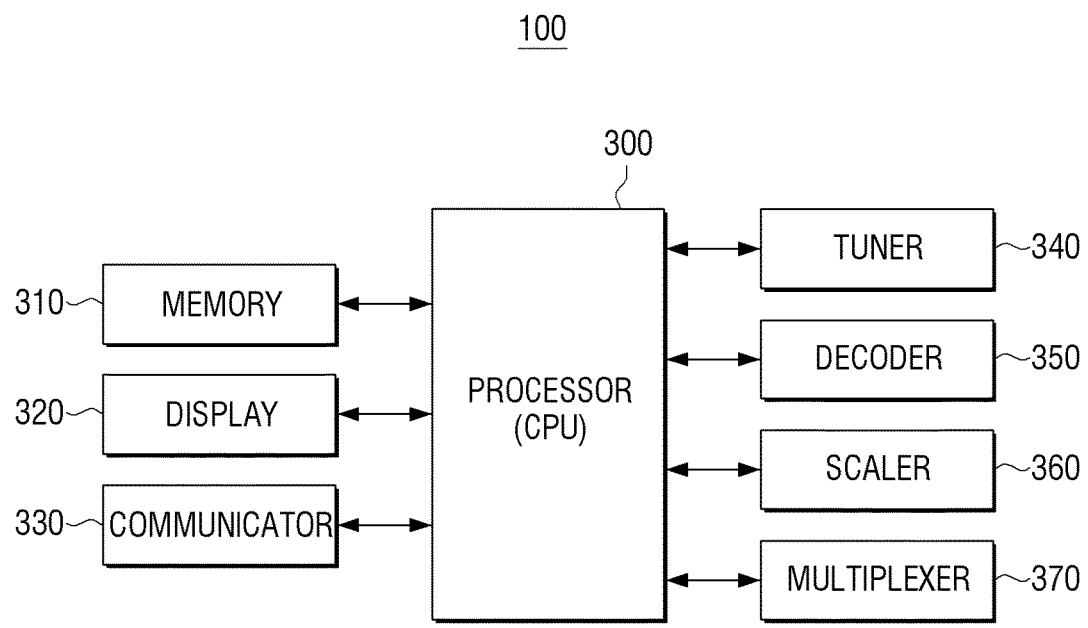
FIG. 3 is a block diagram illustrating an example configuration of an electronic apparatus according to an example embodiment.

FIG. 3 is a block diagram illustrating an example configuration of an electronic apparatus according to an example embodiment.

The electronic apparatus 100 according to an example embodiment may include a processor (e.g., including processing circuitry) 300 of, for example, a main CPU, a memory 310, a display 320, a communicator (e.g., including communication circuitry) 330, a tuner 340, a decoder 350, a scaler 360 and a multiplexer 370. Meanwhile, the configuration of the electronic apparatus 100 illustrated in FIG. 3 is merely an example and the present disclosure is not limited to the above-described block diagram.

The configuration illustrated in FIG. 3 may, for example, and without limitation, be the on-chip system and included in a single chip.

The processor 300 may include various processing circuitry to control overall operations of the electronic apparatus 110 by using various programs stored in the memory 310. The processor 300 may, for example, and without limitation, be the main CPU. The processor 300 may perform various operations by executing various application programs stored in the memory 310.

The processor 300 may access the memory 310 and perform booting using the operating system stored in the memory 310. In addition, the processor 300 may perform various operations by using various programs, contents, data, etc. stored in the memory 310.

The memory 310 may include various program modules for driving the electronic apparatus 100, but the various program modules may be partially omitted, changed or added according to the type and characteristic of the electronic apparatus 100.

The memory 310 may include an internal memory and/or an external memory. The internal memory may include at least one of a volatile memory or a non-volatile memory. Examples of the volatile memory may include dynamic RAM (DRAM), static RAM (SRAM), synchronous dynamic RAM (SDRAM), or the like. Examples of the non-volatile memory may include one of time programmable ROM (OTPROM), programmable ROM (PROM), erasable and programmable ROM (EPROM), electrically erasable and programmable ROM (EEPROM), mask ROM, flash ROM, NAN flash memory, NOR flash memory, etc. In addition, the internal memory may be Solid State Drive (SSD).

The external memory may include flash drive, compact flash (CF), secure digital (SD), micro secure digital (Micro-SD), mini secure digital (Mini-SD), extreme digital (xD), memory stick, or the like. The external memory may be operatively coupled to the electronic apparatus 100 via various interfaces. In addition, the electronic apparatus 100 may further include a storage device such as a hard drive.

The display 320 may include a touch screen, a flexible screen, or the like, but is not limited thereto.

The communicator 330 may include various communication circuitry and communicate with various types of external devices according to various types of communication methods. The communicator 330 may include various communication circuitry, such as, for example, and without limitation, at least one of a Wi-Fi chip, a Bluetooth chip, a wireless communication chip, and an NFC chip, or the like. The processor 300 may communicate with an external server or various external devices by using the communicator 330.

In particular, the Wi-Fi chip and the Bluetooth chip may perform communication in a WiFi method and a Bluetooth method, respectively.

The wireless communication chip may refer, for example, to a chip which performs communication according to various communication standards such as IEEE, Zigbee, 3rd Generation (3G), 3rd Generation Partnership Project (3GPP), Long Term Evolution (LTE), and the like. An NFC chip 944 may refer to a chip which operates in a Near Field Communication (NFC) system where a 13.56 MHz band is used, among various RF-ID frequency bands such as 135 kHz, 13.56 MHz, 433 MHz, 860 to 960 MHz, 2.45 GHz, or the like.

The tuner 340 may include various circuitry and receive a Radio Frequency (RF) signal and convert the RF signal into an Intermediate Frequency (IF) signal.

The decoder 350 may include various circuitry and decode a video signal, a digital image signal, etc., which are separated from the multiplexer 370 and decompress the signals to be transmitted to the scaler 360.

The scaler 360 may include various circuitry and scale the video image signal received from the decoder 350 to be transmitted to the display 320.

The multiplexer 370 may include various circuitry and separate a voice signal and a video signal from an image signal as a demultiplexer and transmit the video signal to the decoder 350.

Figure 4:
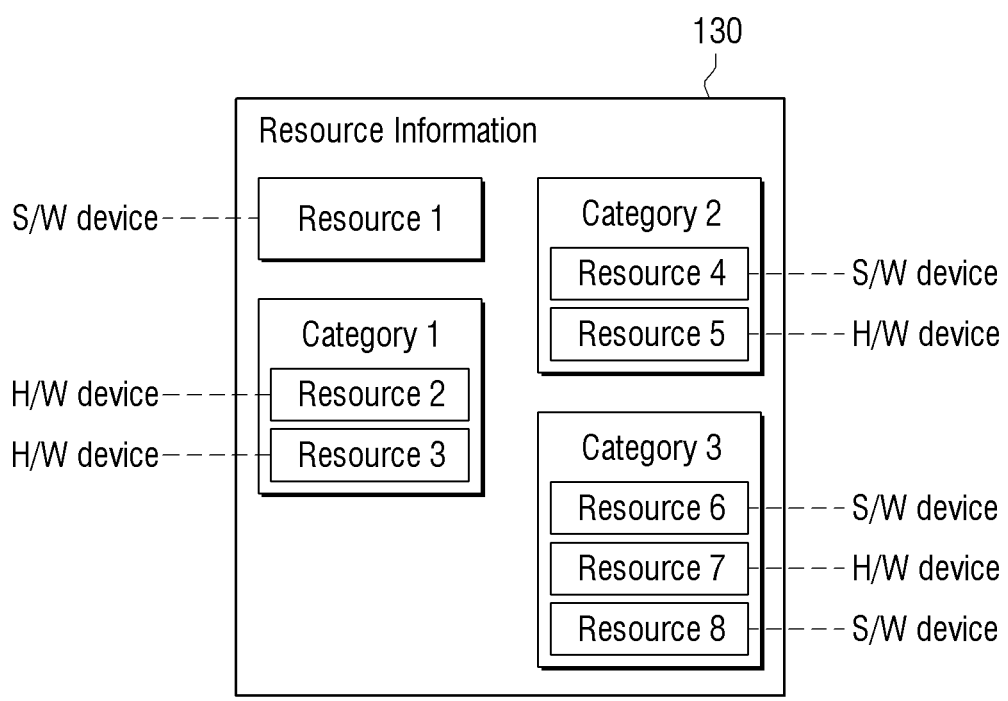
FIG. 4 is a diagram illustrating example resource information including a resource category according to an example embodiment.

FIG. 4 is a diagram illustrating example resource information including a resource category according to an example embodiment.

Referring to FIG. 4, the resource information 130 may include a plurality of resource categories in which the hardware resources and the software resources are assorted by type.

The resource category may include the plurality of resources for providing the same function and/or capability, which are assorted by type. In addition, the resource category may include a name, a type, a data format, etc. of a resource, which are resource information of each of the plurality of resources.

The resource included in the resource information 130 may, for example, be a resource in a minimum unit, which is managed in the resource manager 120 shown in FIG. 1.

For example, a resource 1 may include a software resource in which the electronic apparatus 100 is provided on a web site through a wireless network communication method. The resource 1 may, for example, be a resource supported for performing a specific function of a first application. When there is no hardware resource for performing the specific function of the first application, the resource 1 may solely generate a resource category.

A category 1 may include a resource 2 and a resource 3 which respectively support hardware devices. The name of the category 1 may include information indicating the same function and/or capability of the resource 2 and the resource 3. In addition, the category 1 may include the resource 2 and the resource 3 which support the same hardware device.

For example, the resource 2 may be a general video decoder and the resource 3 may be a 360-degree video virtual reality (VR) decoder. The name of the category 1 may be a video decoder, but this is merely an example for explaining the present disclosure, but the present disclosure is not limited thereto.

A category 2 may include a resource 4, including a software resource for supporting a software device, and a resource 5, which includes a hardware resource for supporting a hardware device.

For example, the resource 4 may be a software resource which supports a software audio path, and the resource 5 may be a hardware resource which supports a hardware audio path. The name of the category 2 may be an audio path, but the present disclosure is not limited thereto.

A category 3 may include a resource 6 and a resource 8, which include software resources for supporting software devices, and a resource 7, which includes a hardware resource for supporting a hardware device.

For example, the resource 6 may be a first software decoder, which is an open source, the resource 8 may be a second software decoder, which is an open source, and the resource 7 may be an MPEG4 decoder. The name of the category 3 may be a decoder, but the present disclosure is not limited thereto.

In addition, according to an example embodiment, the resources included in the resource category may include attribute information of each of the resources. That is, the resource information 130 may include a document describing attributes of hardware resources (physical devices) and software resources (logical devices) in a single computing system.

The attribute information of the resources and a document describing the attribute information according to an embodiment of the present disclosure will be described in detail with reference to FIG. 5.

Figure 5:
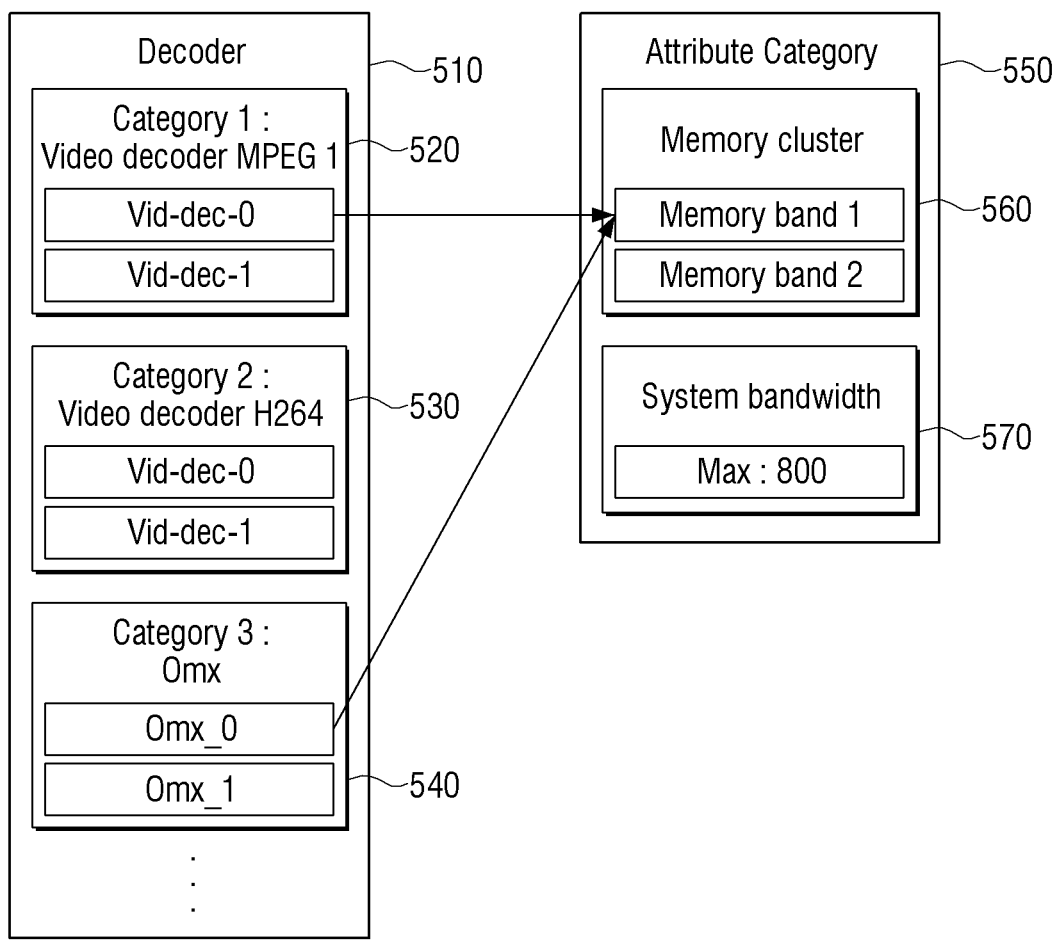
FIG. 5 is a diagram illustrating example resource information including a resource category and an attribute category according to an example embodiment.

FIG. 5 is a diagram illustrating example resource information including a resource category and an attribute category according to an example embodiment.

Referring to FIG. 5, the resource information 130 may assort hardware resources 520 and 530 and a software resource 540 by type to be structured into a resource category 510. In addition, the resource information 130 may assort attributes shared between resources based on attribute information 560 and 570 of resources included in the resource category 510 to structure the attributes into an attribute category 550.

The resource information 130 may describe attributes of the hardware resources 520 and 530 and the software resource 540 in a form of computer program document. For example, a document describing the attributes of the resources 520, 530 and 540 is shown in Table 1 below.

TABLE 1

A document describing the attributes of resources

<category name=""Video_Decoder_MPEG1"" type = ""video-decoder-mpeg1"">
<resource name = ""vid-dec-0"" path=""/dev/video1"" bandwidth=""200"" dependent =""memory_band1""/>
<resource name = ""vid-dec-1"" path=""/dev/video2"" bandwidth=""200"" dependent =""memory_band2""/>
</category>
<category name=""Video_Decoder_H264"" type = ""video-decoder-h264"">
<resource name = ""vid-dec-0"" path=""/dev/video1"" bandwidth=""450"" dependent =""memory_band1""/>
<resource name = ""vid-dec-1"" path=""/dev/video2"" bandwidth=""450"" dependent =""memory_band2""/>
</category>
<category name=""OMX"" type = ""omx"">
<resource name = ""omx_0"" omx_comp_name=""OMX.video.decoder.0"" dependent =""memory_band1""/>
<resource name = ""omx_1"" omx_comp_name=""OMX.video.decoder.1"" dependent =""memory_band2""/>
</category>

Referring to table 1, the resource category 510 may include information of a category name, a category type, a resource name, a resource path, a bandwidth and a memory area, which are required for using a resource, and "dependent" information, which is an attribute of sharing a resource with another resource.

For example, the resource category 510 may have a name of a decoder. The decoder category 510 may include a category 1 520 having a category name of Video Decoder MPEG 1, a category 2 530 having a category name of Video Decoder H264, and a category 3 540 having a category name of OMX.

The category 1 520 may be a video decoder capable of playing a MPEG 1 format video and include a plurality of video decoders with resource names of "vid-dec-0" and "vid-dec-1".

For example, device nodes of two decoders included in the category 1 520 may be '/dev/video1' and '/dev/video2', respectively. When the MMPEG1 is played, the bandwidth of the computing system of 200 bps may be used for each decoder. Also, the two decoders may use memory areas of 'memory_band1' and 'memory_band2', respectively.

The category 2 530 may be a video decoder capable of playing an H264 format video and include a plurality of video decoders with resource names "vid-dec-0" and "vid-dec-1".

For example, two decoders included in the category 2 530 may be the same as the decoder included in the category 1 520. However, a bandwidth (200 bps) consumed when the two decoders play the MPEG1 format video included in the category 1 520 is different from a bandwidth (450 bps) consumed when the two decoders play the H264 format video included in the category 2 530.

Therefore, when the same hardware resources vid-dec-0 and vid-dec-1 are used to play different video formats MPEG1 and H264, attribute information (e.g., a bandwidth) which is required for using the hardware resources vid-dec-0 and vid-dec-1 may be changed.

Thus, according to an example embodiment of the present disclosure, the maximum bandwidth provided when playing a video in a computing system may be 800 bps. Accordingly, bandwidth information 570 may be assorted from the attribute information included in the document describing the attribute information of the resources and included in the attribute category 550.

In addition, the category 3 540 may be an open source decoder and include a plurality of OMX components with resource names of "omx_0" and "omx_1". The OMX may be a software resource as an open resource. The OMX may share attribute information with a specific hardware resource, and thus there may be a restriction on using an OMX resource. The attribute information of the hardware resource that shares attribute information with the OMX, which is a software resource, may be assorted into the attribute category 550.

For example, as shown in Table 1, the hard resources 'vid-dec-0' and 'vid-dec-0' for playing the MPEG1 type video of category 1 520 and the H264 type video of category 2 530, may include the 'memory band1' and the 'memory band2' which are the same memory areas as those of the software resource of the category 3 540.

Accordingly, the use of the memory areas of the software resource of the category 3 540 may be limited by the hardware resource of the category 1 510 or the category 2 520.

Therefore, the 'memory band1' and 'memory band2' may be assorted into a memory cluster category 560 of the attribute category 550, and the 'dependent' information of the document describing the attribute information of Table 1 may further include memory area information.

The resource manager 120 illustrated in FIG. 1 may identify whether resources are allocated to the application 110 based on information on objects (a category name, a resource name, an attribute name of an attribute category, etc.) included in the resource information 130.

For example, the 'vide-dec-0', which is a hardware resource, is different from an 'omx_0', which is a software resource, but may have an exclusive characteristic, which shares the memory area 'memory band1', on the computing system.

Therefore, although the software resource 'omx_0' included in the category 3 540 is in a free state and capable of allocating a resource to an application, when the memory area memory_band1, which is the 'dependent' attribute information of the attribute information of the 'omx_0', shown in Table 1 is used by another resource, the resource manager 120 shown in FIG. 1 may forcibly recover the resource.

Referring to Table 1, the video decoders 'vid-dec-0' and 'vid-dec-1', which are hardware resources, may be independent from each other, but when playing the H264 format video stream, the video decoders each may use the bandwidth of 450 bps of the system bus on the computing system. Accordingly, when the maximum bandwidth, which is processed in the system, is 800 bps, the video decoders included in the category 2 530 may establish an exclusive relationship with each other.

Therefore, although the resources vid-dec-0 and vid-dec-1 included in the category 2 530 are in free states and cable of allocating the resource to the application, the resource manager 120 shown n FIG. 1 may forcibly recover one of two video decoders vid-dec-0 and vid-dec-1 based on information on the bandwidth 570 (Max: 800) of the attribute category 550 of the attribute information.

Figure 6:
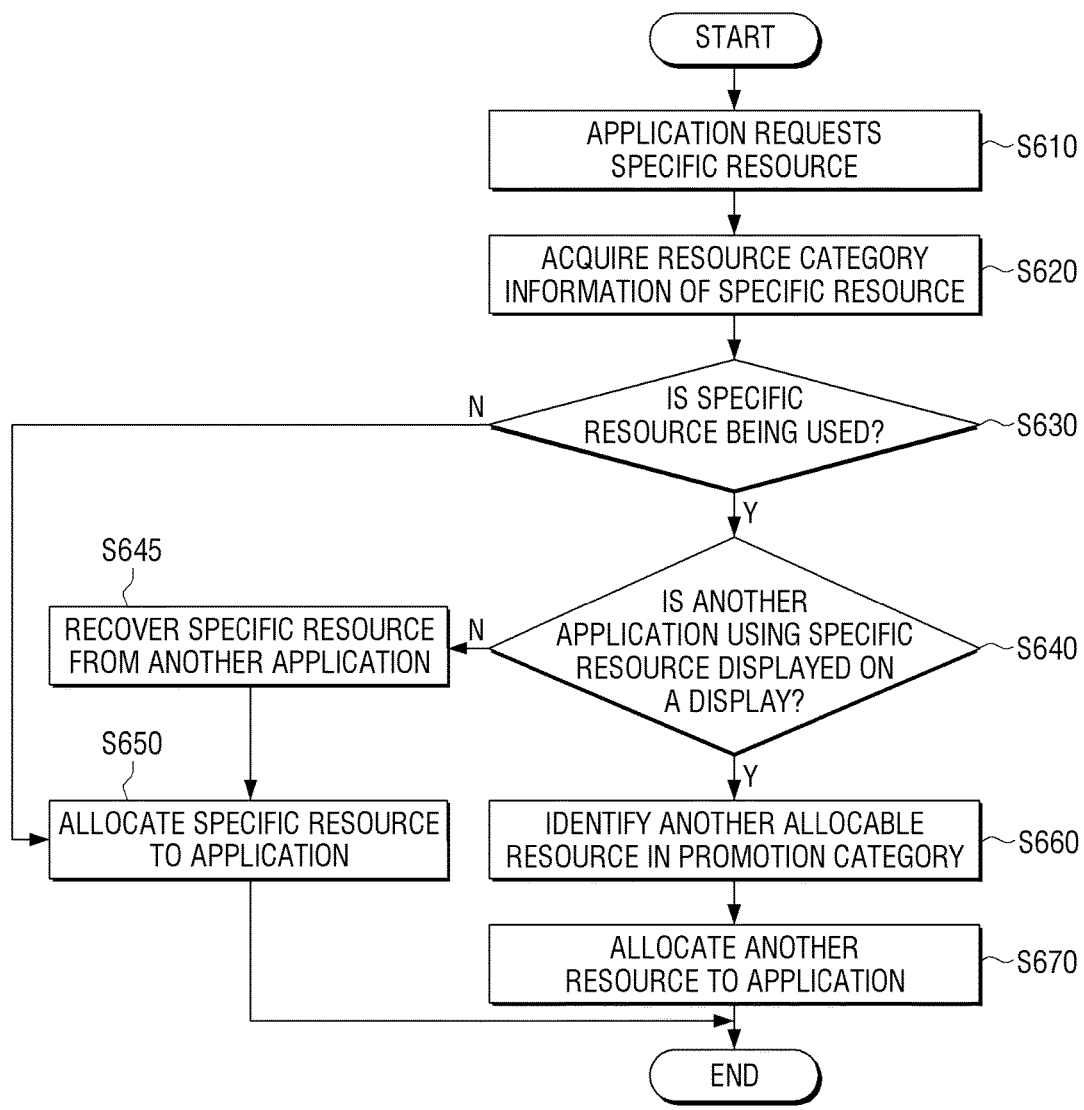
FIG. 6 is a flowchart illustrating example resource management according to an example embodiment.

FIG. 6 is a flowchart illustrating example resource management according to an example embodiment.

FIG. 6 illustrates an example resource management method of the resource manager 120 illustrated in FIG. 1 and the processor 230 illustrated in FIG. 2. According to an example embodiment, the resource manager 120 may be a signal module included in the processor 230, and thus the resource manager 120 will be unified into the processor 230 below.

At step S610, an application may request a specific resource, which is used for executing an application to the processor 230. The application may transmit resource category information of a resource to be used to the processor 230. For example, the resource category information may be information on a resource name, a name of a category including the resource, and attribute information of the resource, but the present disclosure is not limited thereto.

At step S620, the processor 230 may acquire resource category information of a specific resource to be used by the application from the application.

At step S630, the processor 230 may identify whether the specific resource is being used. The processor 230 may identify whether the specific resource is being used by another application based on the resource category information included in the resource information shown in FIGS. 4 and 5. As described in FIG. 5, the processor 230 may identify whether to allocate the specific resource to the application based on information of the resource category and the attribute category.

In response to the specific resource not being in use by another application (S630: N), at step S650, the processor 230 may allocate the specific resource to the application.

In response to the specific resource being in use by another application (S630: Y), at step S640, the processor 230 may identify whether another application using the specific resource is being displayed on a display of the electronic apparatus 100.

When another application using the specific resource is being displayed on the display (S640: Y), at step S660, the processor 230 may not recover the specific resource from another application and identify another resource which is allocable in a promotion category.

At step S670, in response to another resource allocable in the promotion category, another resource may be allocated to the application. The detailed description of the promotion category will be made in FIGS. 8 and 9.

In response to another application using the specific resource not being displayed on the display (S640: N), at step S645, the specific resource may be recovered from another application, and the recovered specific resource may be allocated to the application (S650).

The feature that the application is being displayed on the display may indicate that the application is executed on a foreground on the display of the electronic apparatus 100. In addition, the feature that the application is using the resource or not being displayed on the display may indicate that the application is executed on a background on the display of the electronic apparatus 100.

Information on whether the application is executed on the foreground or on the background of the display may be obtained from a window system of the electronic apparatus 100, as visibility information of the application.

For example, according to an example embodiment of the present disclosure, the first application may request a specific resource to processor 230, and the specific resource may be in use by the second application. When 'visibility' information of the second application is 'invisible', the processor 230 may recover the specific resource from the second application and allocate the specific resource to the first application. However, when 'visibility' information of the second application is 'visible' and 'visibility' of the first application is 'invisible', the processor 230 may not forcibly recover the specific resource from the second application. Accordingly, occurrence of a black screen, caused by forcibly terminating an application currently executed on the display, may be prevented.

Figure 7:
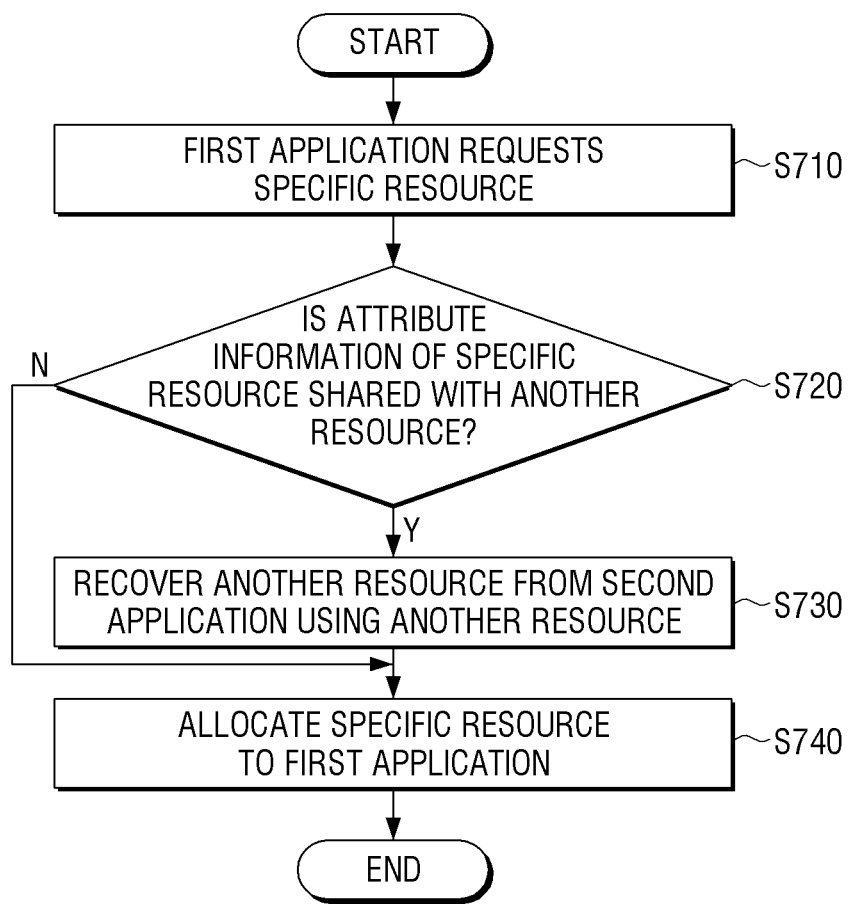
FIG. 7 is a flowchart illustrating example resource management based on an attribute category according to an example embodiment.

FIG. 7 is a flowchart illustrating example resource management based on an attribute category according to an example embodiment.

FIG. 7 also describes a method of identifying whether a specific resource requested by an application is used based on the attribute category described in FIG. 5.

At step S710, the specific resource to be used by the first application may be requested to the processor 230. The first application may transmit resource category information of the specific resource to the processor 230.

For example, the first application may request an MPEG1 decoder 1, which is a hardware resource for displaying an MPEG1 type video. The first application may transmit at least one of information on a category name, a resource name, a device node, a memory area and a bandwidth of the MPEG1 decoder 1 to the processor 230. The above-described example is merely an example for explaining the present disclosure, but the present disclosure is not limited thereto.

At step S720, the processor 230 may identify whether the attribute information of the specific resource is shared with another resource.

Sharing of attribute information between resources may be referred to as an exclusive resource. The exclusive resource may indicate a state where an application is using a resource in an 'exclusive mode', and when another application requests the resource, the resource may be recovered from another application which is using the resource and allocated to the application which requests the resource.

The processor 230 may identify whether the attribute information of the specific resource is shared with another resource based on the 'dependent' information included in the document describing the attribute information shown in Table 1 described in FIG. 5 and the attribute category information.

The attribute information may include at least one of information of a memory area and a bandwidth which are required for using a resource, but the present disclosure is not limited thereto, but further includes another attribute information.

For example, a memory area memory_0 of the MPEG 1 decoder 1 may be shared with an H264 decoder 1 for playing the H264 format video stream.

In response to the attribute information of the specific resource is being shared with another resource (S720: Y), at step S730, the processor 230 may recover another resource from the second application using another resource.

For example, when the second application executes the H264 decoder in the memory area of 'memory_0', the processor 230 may recover the H264 decoder from the second application.

At step S740, the processor 230 may allocate the specific resource to the first application.

For example, although the MPEG1 decoder in a free state for allocating a resource, the H264 decoder sharing the memory area memory_0 with the MPEG1 decoder may be forcibly recovered from the second application. Thus, an available memory area for the specific resource (an MPEG1 decoder) requested by the first application may be expanded.

Figure 8:
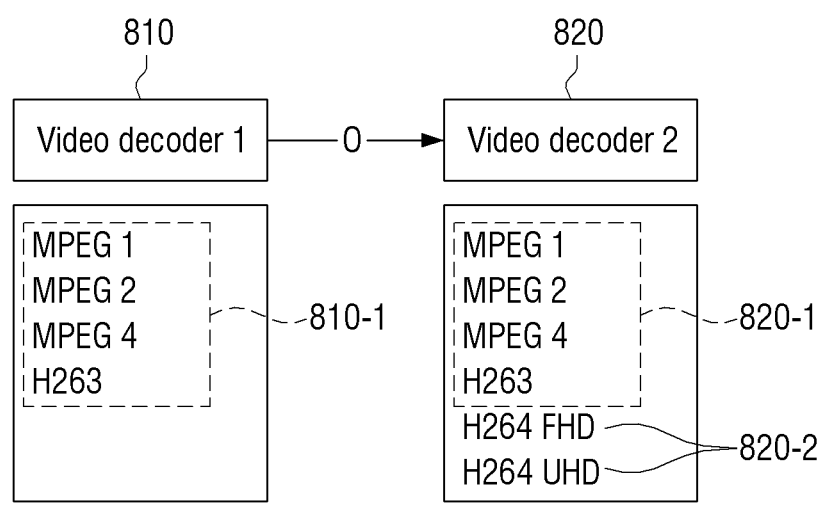
FIGS. 8 and 9 are diagrams illustrating an example promotion category according to an example embodiment.
Figure 9:
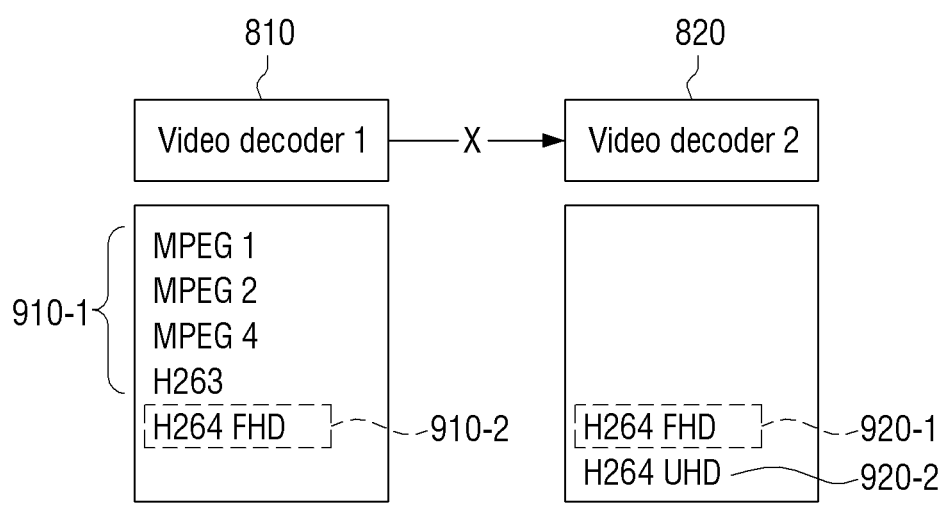

FIGS. 8 and 9 are diagrams illustrating an example promotion category according to an example embodiment.

FIG. 8 illustrates an example of allocating a promotion resource to a resource based on a promotion category according to an example embodiment.

FIG. 9 illustrates an example of not allocating a promotion resource to a resource based on a promotion category according to an example embodiment.

Although the same hardware resource is used, only a part of the specification of the resource may be used depending on the purpose, or a specification of 100% of the resource may be used. In addition, physically different hardware resources may support the same specification.

For example, a first video decoder may be capable of playing a Full High Definition (FHD) video, and a second video decoder may be capable of supporting both a Ultra High Definition (UHD) video and the Full High Definition (FHD) video.

When playing the FHD video by the second video decoder, a specification of a device used by the second video decoder may be reduced by 50% rather than the case of playing the UHD video by the second video decoder. That is, although the hardware resources are physically the same, a part of the specification of the resource may be used depending on the use.

Meanwhile, when playing the UHD video by the second video decoder, and playing the FHD video by the first video decoder, 100% of the specification of the resource may be used.

According to another example, when the first video decoder is allocated and in use by the first application for playing the FHD video, the second application may request for the use of the first video decoder to the electronic apparatus 100 for playing the FHD video.

In the prior art, the first application where the first video decoder is allocated may be terminated, and the second application which requests the resource may operate. Accordingly, although two applications are able to operate, only a single application may operate since a conflict between unnecessary resources occurs.

According to an example embodiment of the present disclosure, the electronic apparatus 100 may map resources for supporting the same data format to the application, among the resources included in the category information illustrated in FIGS. 4 and 5, and store the resource into the promotion category. When a specific resource requested by the application is in use by another application, the electronic apparatus 100 may allocate an available promotion resource, which is mapped to the specific resource stored in the promotion category, to the application.

TABLE 2

A document describing a promotion category

<category name=""""Video_Decoder_Category_01"""" type=""""video-decoder-cat-o1"""" class=""""0"""" promotion=""""video-decoder-cat-02"""">
    <device name = """"video_decoder_01"""" path=""""/dev/video10""""></device>
    <device name = """"video_decoder_02"""" path=""""/dev/video11""""></device>
</category>
<category name = """"Video_Decoder_Category_02"""" type=""""video-decoder-cat-02"""" class=""""0"""">
    <device name = """"video_decoder_03"""" path=""""/dev/video12""""></device>
    <device name = """"video_decoder_04"""" path=""""/dev/video13""""></device>
</category>

The table 2 is a document describing a promotion category according to an example embodiment of the present disclosure. Referring to Table 2, when resources included in the first video category 'video-decoder-cat-01' are not allocable to the application, whether the resources included in the second video category 'video-decoder-cat-2' are available as a 'promotion' resource for the resources included in the first video category for the application.

The information on the promotion category shown in Table 2 may be updated in the attribute category information document shown in FIG. 5. For example, the document may include XML code information, but the present disclosure is not limited thereto.

Referring to FIG. 8 a video decoder 1 810 may be a hardware resource for supporting playing of the FHD video. For example, the video decoder 1 810 may support a data format 810-1 of MPEG1, MPEG2, MPEG4 and H263. A video decoder 2 820 may be a hardware resource for supporting playing of the FHD and UHD video. For example, the video decoder 2 820 may support a data format 820-1 of the MPEG1, MPEG2, MPEG4 and H263 for playing the FHD video, or a data format 820-2 of H264 FHD and H264 UHD for playing the UHD video.

Therefore, when the first application requests the video decoder 1 810 for playing the FHD video, and the video decoder 1 810 is not allocable to the first application, the electronic apparatus 100 may allocate the video decoder 2 820, which is the promotion resource including the data format 810-1 supported by the video decoder 1 810 to the first application. In other words, since the data format 820-1 of the video decoder 2 820 is currently available, the video decoder 2 820 may be allocated to the first application as the promotion resource.

Referring to FIG. 9, when the first application requests the video decoder 1 810 for playing the FHD video, the electronic apparatus 100 may identify the promotion resource including a data format 910-1 supported by the video decoder 1 810 in the resource information shown in FIGS. 4 and 5. The video decoder 2 820 may the data format 920-1 the same as the data format 910-2 supported by the video decoder 1 810, but the data format 910-1 for playing the FHD video may not be available. Therefore, since the data format 910-1 supported by the video decoder 1 810 for playing the FHD video is not currently available in the video decoder 2 820, the video decoder 2 820 may not be allocated to the first application as the promotional resource.

In addition, the video decoder 2 820 illustrated in FIG. 9 may support an H264 UHD 920-2. The memory area may be used more frequently rather than the video decoder 1 810 for playing the H264 UHD. When allocating the resource requested by the application based on the promotion category, the electronic apparatus 100 may preferentially allocate resource having low utilization of a memory and a bandwidth, among resources including data formats supported for executing the application.

Accordingly, according to the above, the conflict between resources, which is occurred by restrictions on the hardware resources may be minimized. In addition, one or more applications request the same resource, the available resource may be allocated in the promotion category, so that a plurality of applications are independently executed. For example, when a new application is executed, and a resource requested by the new application is in use by another application, the formerly executed application may not be terminated. Therefore, during a conversion operation between the plurality of applications, the resource may not be initialized and allocated for executing the application, thereby improving capability of the electronic apparatus 100. In addition, the resource of the computing system may be saved by preferentially allocating a resource having low capability of memory, bandwidth, or the like, among resources included in the promotion category, to the application.

Figure 10:
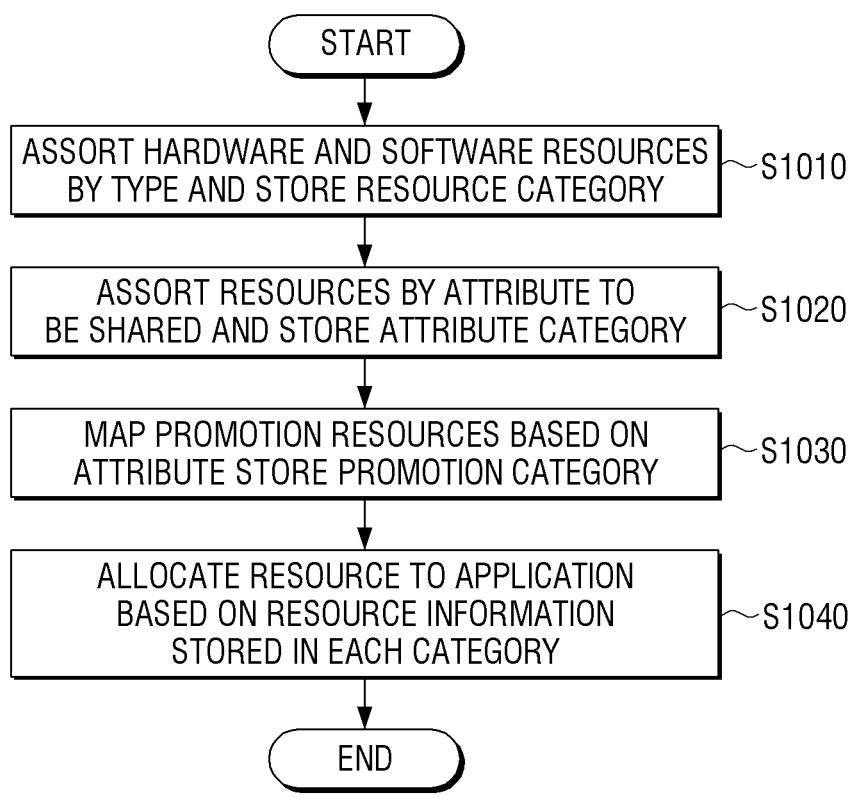
FIG. 10 is a flowchart illustrating an example method of allocating resources based on resource category information according to an example embodiment.

FIG. 10 is a flowchart illustrating an example method of allocating resources based on resource category information according to an example embodiment.

Referring to FIG. 10, at step S1010, the electronic apparatus 100 may assort hardware resources and software resources by type and store the resources into a resource category. The detailed description of the resource category will be made with regard to FIGS. 4 and 5.

At step S1020, the electronic apparatus 100 may assort resources by attribute to be shared using attribute information of resources included in the resource category and store the resources into an attribute category. The description of the attribute category will be made with regard to FIG. 5.

At step S1030, the electronic apparatus 100 may map a promotion resource based on a supportable data format, among attribute information of the resources included in the resource category, and store the promotion resource into a promotion category. The description of the promotion category will be made with regard to FIGS. 8 and 9.

At step S1040, the electronic apparatus 100 may allocate a resource to an application based on resource information stored in each category (a resource category, an attribute category and a promotion category).

For example, the electronic apparatus 100 may search a resource corresponding to what the application requests in each category including resource information in response to a resource allocation request of the application, and identify an available resource, among resources included in each category.

Resource availability may be identified based on state information of the resources included in each resource category. For example, the resources may have four states including a free state, an exclusive state, a sharable state and a shared state.

The free state may refer, for example, to a state where the resource is immediately allocable to the application. For example, in response to a resource allocation to the scaler is being requested from the application, when a video is not output, the resource of the scaler is in the free state, so that the electronic apparatus 100 may immediately allocate the scaler to the application.

The exclusive state may refer, for example, to a state where the application is using the resource in an exclusive mode, and in response to another application requesting the resource, the resource may be recovered from the application which is using the resource.

For example, a video decoder may be a hardware resource capable of decoding only a video source of video data. Accordingly, the resource of the video decoder may be in the exclusive state.

The sharable state may indicate a state where the resource is immediately allocable to the application. Resources having an attribute, which is simultaneously used by two or more applications may be in a sharable state. For example, a TV tuner may simultaneously use various resources, and the resource of the TV tuner is in the sharable state.

The shared state may refer, for example, to a state where one or more applications use a resource having a shared attribute.

Therefore, according to an example embodiment of the present disclosure, when allocating the first resource requested by the first application, in response to the second resource having an exclusive characteristic from the first resource is being used by the second application, the second resource may be forcibly recovered from the second application, and allocated to the first resource.

A method of allocating a resource according to an example embodiment is related to FIGS. 5 to 9.

A device (e.g., modules or the electronic device 100) or a method operations) in accordance with various example embodiments may be performed by at least one computer (e.g., processor 300) for executing instructions included in at least one program, among programs maintained by for example, a computer-readable storage media.

A program may be stored in the computer-readable storage media such as a hard disk, a floppy disk, a magnetic media (e.g., magnetic tape), an optical media (e.g., compact disc read only memory (CD-ROM)), a digital versatile discs (a DVD), a magneto-optical media (e.g., a floptical disk), a hardware device (e.g., a read only memory (ROM), a random access memory (RAM), a flash memory, or the like).

A storage media may typically be included in the electronic apparatus 100, but may be mounted through a port of the electronic apparatus 100, or included in an external device (e.g., a cloud, a server, or another electronic apparatus) outside the electronic apparatus 100. In addition, the program may be divided and stored into a plurality of storage media, and at least a part of the plurality of storage media may be located in the external device outside the electronic apparatus 100.

The foregoing example embodiments and advantages are merely examples and are not to be construed as limiting the present disclosure. The present teaching may be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A resource management method for an electronic apparatus, the method comprising:
    storing resource information including category information for assorting hardware resources and software resources of the electronic apparatus by a plurality of resource types corresponding to a resource category and attribute information for one resource of the hardware resources and software resources of the electronic apparatus, the attribute information for the one resource indicating an additional resource which is needed when the one resource is used; and
    in response to a resource being required from an application of the electronic apparatus, identifying a resource type corresponding to the required resource;
    identifying an available resource included in the identified resource type and the attribute information corresponding to the available resource, based on the resource information;
    allocating the identified available resource to the application; and
    determine whether to recover an additional resource which is allocated to another application, based on the attribute information corresponding to the available resource.

2. The method as claimed in claim 1, wherein the storing comprises assorting a plurality of resources for providing a same function by type as the resource category and storing the plurality of resources, and
    wherein the resource category includes resource information of each of the plurality of resources.

3. The method as claimed in claim 2, wherein the storing comprises assorting the attribute information of the resources included in the resource category by type as the attribute category and storing the attribute information, and
    wherein the attribute information includes at least one of: information of a memory and a bandwidth required for using the resource.

4. The method as claimed in claim 1, wherein the allocating further comprises:
    acquiring information of the at least one resource category including a resource to be used by the application in response to the application requesting the specific resource.

5. The method as claimed in claim 3, wherein the allocating further comprises:
    recovering the resource from another application in response to the resource being in use by another application.

6. The method as claimed in claim 5, wherein the recovering further comprises:
    recovering another resource from another application in response to the attribute information of the attribute category including the resource being shared through another resource by another application.

7. The method as claimed in claim 5, wherein the recovering further comprises:
    determining whether an application is displayed on a display of the electronic apparatus, and
    wherein the resource is not recovered from another application in response to the another application being displayed on the display.

8. The method as claimed in claim 2, wherein the resource information comprises one or more of names of resources included in the at least one resource category, and data formats supported by each of the resources, and
    wherein the storing further comprises storing a promotion category which maps resources supporting a common data format from among the resources.

9. The method as claimed in claim 8, wherein the allocating further comprises:
    allocating a promotion resource mapped to the specific resource stored in the promotion category to the application in response to the specific resource being in use by another application.

10. An electronic apparatus for resource management, the electronic apparatus comprising:
    a memory; and
    a processor configured to:
    store resource information including category information for assorting hardware resources and software resources of the electronic apparatus by a plurality of resource types corresponding to a resource category, and attribute information for one resource of the hardware resources and software resources of the electronic apparatus, the attribute information for the one resource indicating an additional resource which is needed when the one resource is used;
    in response to a resource being required from an application of the electronic apparatus, identify a resource type corresponding to the required resource;
    identify an available resource included in the identified resource type and the attribute information corresponding to the available resource, based on the resource information;
    allocate the identified available resource to the application; and
    determine whether to recover an additional resource which is allocated to another application, based on the attribute information corresponding to the available resource.

11. The electronic apparatus as claimed in claim 10, wherein the processor is configured to assort a plurality of resources for providing a same function by type as the resource category and to store the plurality of resources in the memory, and
    wherein the resource category includes resource information of each of the plurality of resources.

12. The electronic apparatus as claimed in claim 11, wherein the processor is configured to assort attribute information of the resources included in the resource category by type as the attribute category and to store the attribute information in the memory, and
    wherein the attribute information includes at least one of: information of a memory and a bandwidth which are required for using the resource.

13. The electronic apparatus as claimed in claim 10, wherein the processor is configured to acquire information of the at least one resource category including the specific resource in response to the application requesting the specific resource.

14. The electronic apparatus as claimed in claim 13, wherein the processor is configured to recover the specific resource from another application in response to the specific resource being in use by another application.

15. The electronic apparatus as claimed in claim 14, wherein the processor is configured to recover another resource from another application in response to the attribute information of the attribute category including the specific resource being shared through another resource by another application.

16. The electronic apparatus as claimed in claim 14, further comprising:
a display,
wherein the processor is configured to determine whether an application is displayed on the display, and to not recover the specific resource from another application in response to another application being displayed on the display.

17. The electronic apparatus as claimed in claim 11, wherein the resource information comprises one or more of names of resources included in the at least one resource category and data formats supported by each of the resources, and wherein the processor is configured to store a promotion category which maps resources supporting a common data format, from among the resources, in the memory.

18. The electronic apparatus as claimed in claim 17, wherein the processor is configured to allocate a promotion resource mapped to the specific resource stored in the promotion category to the application in response to the specific resource being in use by another application.

19. A non-transitory computer-readable recording medium having recorded thereon a computer program which, when executed by a processor of an electronic device, causes the electronic device to perform a resource management method, the resource management method comprising:
storing resource information including category information for assorting hardware resources and software resources of the electronic apparatus by a plurality of resource types corresponding to a resource category and attribute information for one resource of the hardware of resources and software resources of the electronic apparatus, the attribute information for the one resource indicating an additional resource which is needed when the one resource is used; and
in response to a resource being required from an application of the electronic apparatus, identifying a resource type corresponding to the required resource;
identifying an available resource included in the identified resource type and the attribute information corresponding to the available resource, based on the resource information;
allocating the identified available resource to the application; and
determine whether to recover an additional resource which is allocated to another application, based on the attribute information corresponding to the available resource.

* * * * *